(12) United States Patent
Johnson et al.

(10) Patent No.: US 6,693,732 B2
(45) Date of Patent: Feb. 17, 2004

(54) OPTICAL SAMPLER BASED ON STABLE, NON-ABSORBING OPTICAL HARD LIMITERS

(75) Inventors: Erik V. Johnson, Toronto (CA); Edward H. Sargent, Toronto (CA)

(73) Assignee: Nortel Networks Limited (CA)

(*) Notice: Subject to any disclaimer, the term of this patent is extended or adjusted under 35 U.S.C. 154(b) by 123 days.

(21) Appl. No.: 09/933,330

(22) Filed: Aug. 20, 2001

(65) Prior Publication Data

US 2002/0109874 A1 Aug. 15, 2002

Related U.S. Application Data

(60) Provisional application No. 60/267,879, filed on Feb. 9, 2001.

(51) Int. Cl.[7] .................................................. G02F 3/00
(52) U.S. Cl. ...................... 359/108; 359/107; 359/244; 359/237; 359/582
(58) Field of Search .................................... 359/107, 108, 359/237, 244, 240, 582, 239; 708/191

(56) References Cited

U.S. PATENT DOCUMENTS

| | | | |
|---|---|---|---|
| 4,128,300 A | 12/1978 | Stotts et al. | |
| 4,262,992 A | 4/1981 | Berthold, III | |
| 4,573,767 A | 3/1986 | Jewell | |
| 4,764,889 A | 8/1988 | Hinton et al. | |
| 4,864,536 A | 9/1989 | Lindmayer | |
| 4,894,818 A | 1/1990 | Fujioka et al. | |
| 4,930,873 A | 6/1990 | Hunter | |
| 4,932,739 A | 6/1990 | Islam | |
| 4,962,987 A | 10/1990 | Doran | |
| 4,992,654 A | 2/1991 | Crossland et al. | |
| 5,078,464 A | 1/1992 | Islam | |
| 5,144,375 A | 9/1992 | Gabriel et al. | |
| 5,315,422 A | 5/1994 | Utaka et al. | |
| 5,349,593 A | 9/1994 | Lomashevitch et al. | |
| 5,461,507 A | 10/1995 | Westland et al. | |
| 5,479,384 A | 12/1995 | Toth et al. | |
| 5,488,501 A | 1/1996 | Barnsley | |
| 5,537,243 A | 7/1996 | Fatehi et al. | |
| 5,617,232 A | 4/1997 | Takemori | |
| 5,623,366 A | 4/1997 | Hait | |
| 5,655,039 A | 8/1997 | Evans | |
| 5,739,933 A | 4/1998 | Dembeck et al. | |
| 5,831,731 A | 11/1998 | Hall et al. | |
| 5,999,283 A | 12/1999 | Roberts et al. | |
| 5,999,284 A | 12/1999 | Roberts | |
| 6,005,791 A | 12/1999 | Gudesen et al. | |
| 6,041,126 A | 3/2000 | Terai et al. | |
| 6,044,341 A | 3/2000 | Takahashi | |

OTHER PUBLICATIONS

"Wave proagation in nonlinear photonic band–gap materials" Li, et. al., Physical Review B: Condensed Matter vol. 53, No. 23, 15577–15585 (Jun. 15, 1996).

"Three–Dimensional Arrays in Polymer Nanocomposites" Kumacheva, et al., Advanced Material, 1999, 11, No. 3.

"Intergrable, Low–Cost, All–Optical WDM Signal Processing: Narrowband Hard Limiters and Analog–to–Digital Converters" Sargent, et al., Jan. 2000.

"Nonlinear Distributed Feedback Structures for Optical Sensor Protection" Brzozowski, et al., Apr. 2000.

(List continued on next page.)

*Primary Examiner*—Drew A. Dunn
*Assistant Examiner*—Fayez Assaf
(74) *Attorney, Agent, or Firm*—Steubing McGuinness & Manaras LLP

(57) ABSTRACT

An optical sampler based on stable, non-absorbing optical hard limiters includes an optical feedback loop for storing an optical signal in optical form. The optical feedback loop includes appropriate components for amplifying/ reproducing the stored optical signal. The optical sampler outputs the stored optical signal.

9 Claims, 2 Drawing Sheets

OTHER PUBLICATIONS

"Optical Signal Processing Using Nonlinear Distributed Feedback Structures" Brzozowski, et al., IEEE Journal of Quantum Electronics, vol. 36, No. 5, May 2000.

"All–Optical Analog–to–Digital Converter for Photonic Networks Using Multilevel Signaling" Brzozowski, et al., Jun., 2000.

"Photonic Crystals for Intergrated Optical Computing" Brzozowski, et al., Jun. 2000.

"Nonlinear distributed–feedback structures as passive optical limiters" Brzozowski, et al., J. Opt. Soc. Am B, vol. 17, No. 8, Aug. 2000.

"Stability of Periodic Nonlinear Optical Structures for Limiting and Logic", Brzozowski, et al., Sep. 2000.

"Transmission Regimes of Periodic Nonlinear Optical Structures" Pelinovsky, Dmitry, Rapid Communications, Physical Review E, vol. 62, No. 4, Oct. 2000.

"Nonlinear Disordered Media for Broad–Band Optical Limiting" Brzozowski, et al., IEEE Journal of Quantum Electronics, vol. 36, No. 11, Nov. 2000.

"Realization of All–Optical Ultrafast Logic Gates Using Triple Core Asymmetric Nonlinear Directional Coupler", Natasa Trivunac–Vukovic, Journal of Optical Communications, 2001.

"All–Optical Analog–to Digital Converters, Hardlimiters, and Logic Gates", Brzozowski, et al., Journal of Lightwave Technology, vol. 19, No. 1, Jan. 2001.

"Stable All–Optical Limiting in Nonlinear Periodic Structures", Pelinovsky et al., Feb. 8, 2001.

"All–Optical Signal Processing and Packet Forwarding Using Nonmonotonic Intensity Transfer Characteristics", Johnson, E.V., A thesis submitted in conformity with the requirements for the degree of Master of Applied Science Graduate Department of electrical and Computer Engineering University of Toronto, 2001.

OPTICAL SAMPLER BASED ON STABLE, NON-ABSORBING OPTICAL HARD LIMITERS

PRIORITY

The present application claims priority from U.S. Provisional Patent Application No. 60/267,879, which was filed on Feb. 9, 2001, and is hereby incorporated herein by reference in its entirety.

CROSS-REFERENCE TO RELATED APPLICATION(S)

The present application may be related to the following commonly owned U.S. patent applications, which are hereby incorporated herein by reference in their entireties:

U.S. patent application Ser. No. 09/846,886 entitled OPTICAL LIMITER BASED ON NONLINEAR REFRACTION, filed on May 1, 2001 in the names of Edward H. Sargent and Lukasz Brzozowski; and U.S. patent application Ser. No. 09/933,315 entitled OPTICAL LOGIC DEVICES BASED ON STABLE, NON-ABSORBING OPTICAL HARD LIMITERS, filed on even date herewith in the names of Erik V. Johnson and Edward H. Sargent.

FIELD OF THE INVENTION

The present invention relates generally to optical information processing, and more particularly to storing an optical signal in the optical state.

BACKGROUND OF THE INVENTION

In today's information age, optical communication technologies are being used more and more frequently for transmitting information at very high speeds. Traditionally, information processing equipment (such as switches, routers, and computers) process information electronically. Therefore, optical communications are often converted into electronic form for processing by the information processing equipment. This electronic processing is slow relative to the speed of the optical communications themselves, and thus often becomes a "bottleneck" of optical communication and processing systems.

Optical information processing systems process information optically without the need to convert the information to an electronic form for processing electronically. One challenge in an optical information processing is the storage of an optical signal. Traditionally, storage of an optical signal would be accomplished by detecting the signal with a photodetector, converting it into excited carriers, and then storing these excited carriers electronically. This technique for storing optical signals is limited by the speed of the electronics and becomes unsatisfactory as optical communication speeds increase.

Thus, optical information processing systems need to store an optical signal in the optical state. The use of bistable devices to store optical signals has been explored (U.S. Pat. Nos. 4,573,767, 4,930,873, 5,349,593, 5,461,507, 5,537, 243), and the use of stable devices with feedback has also been examined (U.S. Pat. Nos. 5,617,232, 5,999,284). As well, devices which store information as a chemical reaction have been patented (U.S. Pat. Nos. 4,864,536, 4,992,654, 5,479,384, 6,005,791).

SUMMARY OF THE INVENTION

In accordance with one aspect of the invention, an optical sampler based on stable, non-absorbing optical hard limiters includes an optical feedback loop for storing an optical signal in optical form. The optical feedback loop includes appropriate components for amplifying/reproducing the stored optical signal. The optical sampler outputs the stored optical signal.

DETAILED DESCRIPTION OF A PREFERRED EMBODIMENT

In an embodiment of the present invention, an optical sampler stores an optical signal in the optical state. The optical sampler is based on stable, non-absorbing optical hard limiters. An exemplary stable, non-absorbing optical hard limiter is described in the related application entitled OPTICAL LIMITER BASED ON NONLINEAR REFRACTION, which was incorporated by reference above. Various optical logic devices based on stable, non-absorbing optical hard limiters that may be used as components of the optical sampler are described in the related application entitled OPTICAL LOGIC DEVICES USING STABLE, NON-ABSORBING OPTICAL HARD LIMITERS, which was incorporated by reference above.

An exemplary optical sampler is described. The exemplary optical sampler has a layout similar to an electronic D-type flip-flop and works in a similar manner, although it should be noted that the signals processed by the optical sampler are optical signals that are reduced by approximately one half when split. As with a typical D-type flip-flop, an optical input signal is sampled (latched) based upon a clock signal. The sampled optical input signal is stored by placing the sampled optical input signal in an optical feedback loop. The optical feedback loop provides appropriate amplification/regeneration of the sampled optical input signal. The sampled and stored optical input signal is used to generate an output signal equal to the optical input signal. Once the optical input signal is sampled, the output signal is latched to the optical input signal, and does not change until a new optical input signal is sampled regardless of the state of the optical input signal.

Figure 1:
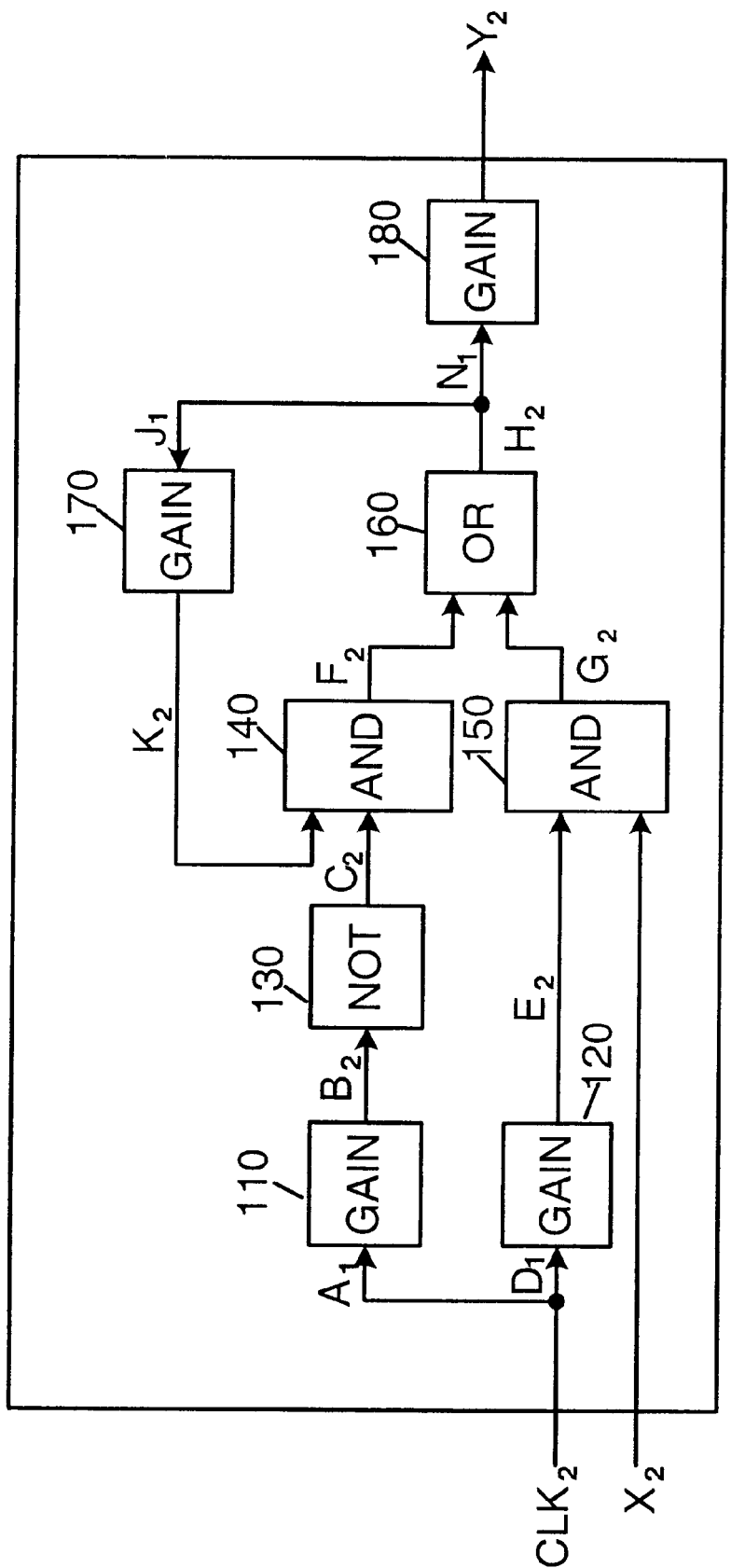
FIG. 1 is a schematic block diagram showing a first exemplary optical sampler built from optical logic gates based upon stable, non-absorbing optical hard limiters for use with input/output signals in a range $\{0, I2\}$ in accordance with an embodiment of the present invention.

FIG. 1 is a conceptual schematic block diagram showing an exemplary optical sampler 100 built from various optical logic gates described in the related application entitled OPTICAL LOGIC DEVICES USING STABLE, NON-ABSORBING OPTICAL HARD LIMITERS, which was incorporated by reference above. It should be noted that all input, output, and intermediate signals are optical. In this embodiment, input and output signals are in the range $\{0, I2\}$. It should also be noted that certain optical signals are split into two branches, which reduces the signal strength by approximately one half on each branch. Therefore, some intermediate signals are in the range $\{0, I2\}$, while other intermediate signals are in the range $\{0, I1\}$. For convenience, signals in the range $\{0, I1\}$ are denoted by a number 1, while signals in the range $\{0, I2\}$ are denoted by a number 2. The direction of photon propagation is indicated with arrows.

The optical sampler 100 includes, among other things, optical gain element 110, optical gain element 120, optical NOT gate 130, optical AND gate 140, optical AND gate 150, optical OR gate 160, optical gain element 170, and optical gain element 180. The optical sampler 100 has two inputs, namely a clock signal CLK2 and an input signal X2, and one output, namely output signal Y2. All input and output signals are in the range {0, I2}.

The clock signal CLK2 is split into signals A1 and D1.

The signal A1 is coupled to the input of the optical gain element 110. The optical gain element 110 converts the signal A1 in the range {0, I1} into signal B2 in the range {0, I2}. The signal B2 from the optical gain element 110 is coupled to the input of the optical NOT gate 130. The signal C2 from the optical NOT gate 130 is coupled to one input of the optical AND gate 140.

The signal D1 is coupled to the input of the optical gain element 120. The optical gain element 120 converts the signal D1 in the range {0, I1} into signal E2 in the range {0, I2}. The signal E2 from the optical gain element 120 is coupled to one input of the optical AND gate 150, while the input signal X2 is coupled to the other input of the optical AND gate 150.

The signal F2 from the optical AND gate 140 is coupled to one input of the optical OR gate 160, while the signal G2 from the optical AND gate 150 is coupled to the other input of the optical OR gate 160.

The signal H2 from the optical OR gate 160 is split into signals N1 and J1.

The signal N1 is coupled to the input of the optical gain element 180. The optical gain element 180 converts the signal N1 in the range {0, I1} into the output signal Y2 in the range {0, I2}.

The signal J1 is coupled to the input of the optical gain element 170. The optical gain element 170 converts the signal J1 in the range {0, I1} into signal K2 in the range {0, I2}. The signal K2 from the optical gain element 170 is coupled to the other input of the optical AND gate 140.

When the clock signal CLK2 is I2 (high), the optical AND gate 150 is essentially activated, while the optical AND gate 140 is deactivated. In this state, the optical AND gate 150 feeds the input signal X2 to the optical OR gate 160 as signal G2, while the optical AND gate 140 feeds a zero signal to the optical OR gate 160 as signal F2. The optical OR gate 160 in turn outputs signal H2 equal to the input signal X2. The signal H2 is split into signals I1 and J1. The signal I1 is amplified by the optical gain element 180 in order to produce the output signal Y2 equal to the input signal X2. The signal J1 is amplified by the optical gain element 170 to produce looped back signal K2 equal to the input signal X2, which is fed into the optical AND gate 140.

When the clock signal CLK2 transitions to zero (low), the optical AND gate 150 is essentially deactivated, while the optical AND gate 140 is activated. In this state, the optical AND gate 140 feeds the looped back signal K2 to the optical OR gate 160 as signal F2. The optical OR gate 160 in turn outputs signal H2 equal to the looped back signal K2. The signal H2 is split into signals I1 and J1. The signal I1 is amplified by the optical gain element 180 in order to produce the output signal Y2 equal to the looped back signal K2. The signal J1 is amplified by the optical gain element 170 to reproduce looped back signal K2, which is fed into the optical AND gate 140.

Thus, when the clock signal CLK2 transitions from I2 (high) to zero (low), the optical input signal X2 is sampled (latched) so that the output signal Y2 is driven to, and remains at, the sampled input signal regardless of the state of the optical input signal X2 so long as the clock signal CLK2 remains zero (low). The sampled input signal is essentially stored in the feedback loop consisting of the optical AND gate 140, the signal F2, the optical OR gate 160, the signal H2, the signal J1, the optical gain element 170, and the signal K2.

It should be noted that, in the described embodiment, there is an inherent delay in the feedback loop that eliminates the need for falling/rising edge triggers that are needed in a traditional electronic D-type flip-flop. Without this inherent delay, simultaneous high-to-low transitions on both the clock signal CLK2 and the input signal X2 would generally cause a glitch on the output signal Y2. By eliminating the falling/rising edge triggers, this inherent delay greatly simplifies the optical sampler 100. It should be noted, however, that appropriate falling/rising edge triggers can be added to a particular optical sampler embodiment if there is an unsufficient amount of inherent delay in its feedback loop.

Figure 2:
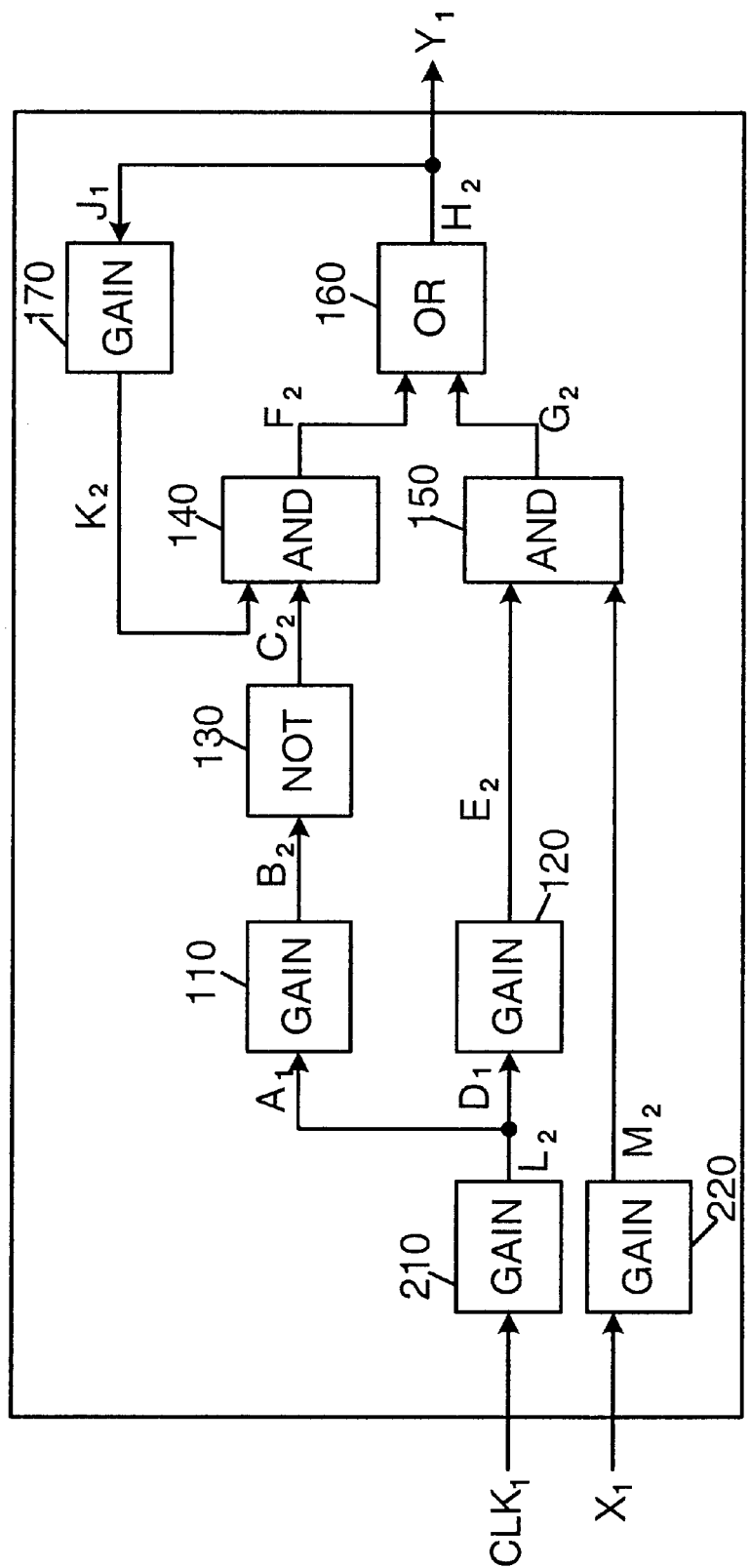
FIG. 2 is a schematic block diagram showing a second exemplary optical sampler built from optical logic gates based upon stable, non-absorbing optical hard limiters for use with input/output signals in a range $\{0, I1\}$ in accordance with an embodiment of the present invention.

FIG. 2 is a conceptual schematic block diagram showing an exemplary optical sampler 200 built from various optical logic gates described in the related application entitled OPTICAL LOGIC DEVICES USING STABLE, NON-ABSORBING OPTICAL HARD LIMITERS, which was incorporated by reference above. It should be noted that all input, output, and intermediate signals are optical. In this embodiment, input and output signals are in the range {0, I1}. It should also be noted that certain optical signals are split into two branches, which reduces the signal strength by approximately one half on each branch. Therefore, some intermediate signals are in the range {0, I2}, while other intermediate signals are in the range {0, I1}. For convenience, signals in the range to, {0, I1} are denoted by a number 1, while signals in the range {0, I2} are denoted by a number 2. The direction of photon propagation is indicated with arrows.

The optical sampler 200 includes, among other things, optical gain element 110, optical gain element 120, optical NOT gate 130, optical AND gate 140, optical AND gate 150, optical OR gate 160, optical gain element 170, optical gain element 210, and optical gain element 220. The optical sampler 200 has two inputs, namely a clock signal CLK1 and an input signal X1, and one output, namely output signal Y1. All input and output signals are in the range {0, I1}.

The clock signal CLK1 is coupled to the input of the optical gain element 210. The optical gain element 210 converts the signal CLK1 in the range {0, I1} into signal L2 in the range {0, I2}. The signal L2 is split into signals A1 and D1.

The signal A1 is coupled to the input of the optical gain element 110. The optical gain element 110 converts the signal A1 in the range {0, I1} into signal B2 in the range {0, I2}. The signal B2 from the optical gain element 110 is coupled to the input of the optical NOT gate 130. The signal C2 from the optical NOT gate 130 is coupled to one input of the optical AND gate 140.

The signal D1 is coupled to the input of the optical gain element 120. The optical gain element 120 converts the signal D1 in the range {0, I1} into signal E2 in the range {0, I2}. The signal E2 from the optical gain element 120 is coupled to one input of the optical AND gate 150.

The input signal X1 is coupled to the input of the optical gain element 220. The optical gain element 220 converts the input signal X1 in the range {0, I1} into signal M2 in the range {0, I2}. The signal M2 is coupled to the other input of the optical AND gate 150.

The signal F2 from the optical AND gate 140 is coupled to one input of the optical OR gate 160, while the signal G2 from the optical AND gate 150 is coupled to the other input of the optical OR gate 160.

The signal H2 from the optical OR gate 160 is split into output signal Y1 and signal J1.

The signal J1 is coupled to the input of the optical gain element 170. The optical gain element 170 converts the signal J1 in the range {0, I1} into signal K2 in the range {0, I2}. The signal K2 from the optical gain element 170 is coupled to the other input of the optical AND gate 140.

When the clock signal CLK1 is I1, the optical AND gate 150 is essentially activated, while the optical AND gate 140 is deactivated. In this state, the optical AND gate 150 feeds the signal M2 to the optical OR gate 160 as signal G2, while the optical AND gate 140 feeds a zero signal to the optical OR gate 160 as signal F2. The optical OR gate 160 in turn outputs signal H2 equal to the signal M2. The signal H2 is split into output signal Y1 and signal J1. The signal J1 is amplified by the optical gain element 170 to produce looped back signal K2 equal to the signal M2, which is fed into the optical AND gate 140.

When the clock signal CLK1 transitions to zero, the optical AND gate 150 is essentially deactivated, while the optical AND gate 140 is activated. In this state, the optical AND gate 140 feeds the looped back signal K2 to the optical OR gate 160 as signal F2. The optical OR gate 160 in turn outputs signal H2 equal to the looped back signal K2. The signal H2 is split into output signal Y1 and signal J1. The signal J1 is amplified by the optical gain element 170 to reproduce looped back signal K2, which is fed into the optical AND gate 140.

Thus, when the clock signal CLK1 transitions from I1 to zero, the optical input signal X1 is sampled (latched) so that the output signal Y1 is driven to, and remains at, the sampled input signal regardless of the state of the optical input signal X1 so long as the clock signal CLK1 remains zero. The sampled input signal is essentially stored in the feedback loop consisting of the optical AND gate 140, the signal F2, the optical OR gate 160, the signal H2, the signal J1, the optical gain element 170, and the signal K2.

It should be noted that, in the described embodiment, there is an inherent delay in the feedback loop that eliminates the need for falling/rising edge triggers that are needed in a traditional electronic D-type flip-flop. Without this inherent delay, simultaneous I1-to-zero transitions on both the clock signal CLK1 and the input signal X1 would generally cause a glitch on the output signal Y1. By eliminating the falling/rising edge triggers, this inherent delay greatly simplifies the optical sampler 200. It should be noted, however, that appropriate falling/rising edge triggers can be added to a particular optical sampler embodiment if there is an unsufficient amount of inherent delay in its feedback loop.

Additional considerations are discussed in E. V. Johnson, ALL-OPTICAL SIGNAL PROCESSING AND PACKET FORWARDING USING NONMONOTONIC INTENSITY TRANSFER CHARACTERISTICS, a thesis submitted in conformity with the requirements for the degree of Master of Applied Science, Graduate Department of Electrical and Computer Engineering, University of Toronto (2001), which is hereby incorporated herein by reference in its entirety.

The present invention may be embodied in other specific forms without departing from the true scope of the invention. The described embodiments are to be considered in all respects only as illustrative and not restrictive.

What is claimed is:

1. An optical sampler comprising:

an optical feedback loop comprising, stable, non-absorbing optical hard limiters for storing an optical signal.

2. The optical sampler of claim 1, further comprising an optical sampler operably coupled to the optical feedback loop for sampling the optical signal based upon an optical clock signal and storing the sampled optical signal in the optical feedback loop.

3. The optical sampler of claim 2, wherein the optical sampler is operably coupled to sample the optical signal upon a transition of the optical clock signal from a high level to a low level.

4. The optical sampler of claim 1, further comprising an optical output for outputting the stored optical signal.

5. The optical sampler of claim 1, wherein the optical feedback loop is operably coupled to reproduce the optical signal.

6. The optical sampler of claim 5, wherein the optical feedback loop comprises an optical gain element for reproducing the optical signal from a signal approximately one half of the optical signal.

7. An optical sampler comprising:

means comprising, stable, non-absorbing optical hard limiters for sampling an optical input signal; and means comprising, stable, non-absorbing optical hard limiters for storing the optical input signal.

8. The optical sampler of claim 7, wherein the means for storing the optical input signal comprises an optical feedback loop.

9. An optical sampler comprising:

a latch comprising, stable, non-absorbing optical hard limiters for sampling an optical input signal responsive to a clock signal;

a feedback loop comprising, stable, non-absorbing optical hard limiters, coupled to the latch, for storing a value of the optical signal to provide as an output signal.

* * * * *